US012322943B2

United States Patent
White

(10) Patent No.: US 12,322,943 B2
(45) Date of Patent: Jun. 3, 2025

(54) NON-WELDED HORIZONTAL CABLE TRAY REDIRECTOR

(71) Applicant: James C. White Company, Inc., Greenville, SC (US)

(72) Inventor: Thomas C. White, Greenville, SC (US)

(73) Assignee: James C. White Company, Inc., Greenville, SC (US)

( * ) Notice: Subject to any disclaimer, the term of this patent is extended or adjusted under 35 U.S.C. 154(b) by 0 days.

(21) Appl. No.: 18/439,266

(22) Filed: Feb. 12, 2024

(65) Prior Publication Data

US 2024/0186774 A1 Jun. 6, 2024

Related U.S. Application Data

(63) Continuation of application No. 17/498,924, filed on Oct. 12, 2021, now Pat. No. 11,936,172, which is a
(Continued)

(51) Int. Cl.
*H02G 3/04* (2006.01)
*F16L 3/26* (2006.01)
*G02B 6/44* (2006.01)

(52) U.S. Cl.
CPC .............. *H02G 3/0456* (2013.01); *F16L 3/26* (2013.01); *G02B 6/4453* (2013.01)

(58) Field of Classification Search
CPC ........ H02G 3/0456; F16L 3/26; G02B 6/4453
See application file for complete search history.

(56) References Cited

U.S. PATENT DOCUMENTS 3,351,699 A * 11/1967 Merckle ............... H02G 3/0418
174/101
4,951,716 A * 8/1990 Tsunoda ............... H02G 3/0418
174/101
(Continued)

FOREIGN PATENT DOCUMENTS

CA 3014819 A1 * 8/2017 .......... H02G 3/0608
CN 208433706 U * 1/2019
(Continued)

OTHER PUBLICATIONS

Cable-Race® dedicated tray support system catalog dated 2019, (Year: 2019).*
(Continued)

*Primary Examiner* — Eret C McNichols
*Assistant Examiner* — Ding Y Tan
(74) *Attorney, Agent, or Firm* — Seth L. Hudson; Maynard Nexsen PC

(57) ABSTRACT

Improved design of cable tray redirector components speeds assembly and connection of cable trays. More efficiently manufactured, universal components needed throughout horizontal redirectors of a specific size and type cable tray run reduce the overall total items and cost of inventory. The improvement is in part the elimination of welding cable redirector components in favor of connecting the components with bolts and nuts in the field. The inventory and shipment of individual parts is substantially more efficient because the new components "nest" efficiently prior to assembly. Moreover, components are designed to minimize the number of bolts and nuts used without jeopardizing strength. The use of bolts and nuts to fasten the components also enables good electrical conductivity for effective electrical grounding of the assembled cable tray system.

20 Claims, 19 Drawing Sheets

Related U.S. Application Data continuation of application No. 16/892,974, filed on Jun. 4, 2020, now Pat. No. 11,171,470.

(56) References Cited

U.S. PATENT DOCUMENTS

| | | | | |
|---|---|---|---|---|
| 5,469,893 | A * | 11/1995 | Caveney | H02G 3/0608 174/101 |
| 6,037,543 | A * | 3/2000 | Nicoli | H02G 3/0608 52/287.1 |
| 9,184,578 | B2 * | 11/2015 | Winn | H02G 3/0443 |
| 9,841,123 | B1 * | 12/2017 | White | H02G 3/0608 |
| 11,171,470 | B1 | 11/2021 | White | |
| 11,936,172 | B1 | 3/2024 | White | |
| 2010/0133390 | A1 * | 6/2010 | Lange | H02G 3/0418 248/65 |
| 2012/0312761 | A1 * | 12/2012 | White | H02G 3/0608 403/205 |
| 2015/0076291 | A1 * | 3/2015 | Winn | H02G 3/0443 248/49 |
| 2016/0077299 | A1 * | 3/2016 | Tally | G02B 6/4459 385/135 |
| 2016/0197464 | A1 * | 7/2016 | Kellerman | F16M 13/02 248/68.1 |
| 2022/0360061 | A1 * | 11/2022 | Desai | F16L 3/26 |

FOREIGN PATENT DOCUMENTS

| | | | | |
|---|---|---|---|---|
| DE | 102017120728 | A1 | 3/2019 | |
| EP | 1249653 | A1 * | 10/2002 | F16B 5/0016 |
| EP | 1249653 | B1 | 10/2002 | |
| EP | 2846428 | A1 * | 3/2015 | H02G 3/0437 |
| FR | 2682311 | | 4/1993 | |
| FR | 2682311 | A1 * | 4/1993 | B21D 51/52 |
| GB | 2267605 | A * | 12/1993 | H02G 3/0608 |
| GB | 2268838 | A * | 1/1994 | H02G 3/0608 |
| GB | 2467443 | A * | 8/2010 | F01N 1/003 |
| GB | 2527600 | A | 12/2015 | |
| KR | 20110008103 | U * | 8/2011 | |
| PL | 191621 | * | 4/1999 | |
| PL | 191621 | B1 | 6/2006 | |
| WO | WO-9307665 | A1 * | 4/1993 | H02G 3/0608 |
| WO | 2012127087 | A2 | 9/2012 | |
| WO | WO-2017147256 | A1 * | 8/2017 | H02G 3/0608 |

OTHER PUBLICATIONS

James White Tubetrack 2017 product catalog for continuous tray support system (Year: 2017).*
Techline Mfg. snap track catalog for Aluminum Cable Tray Systems, 76 pages, 2017 (Year: 2017).

* cited by examiner

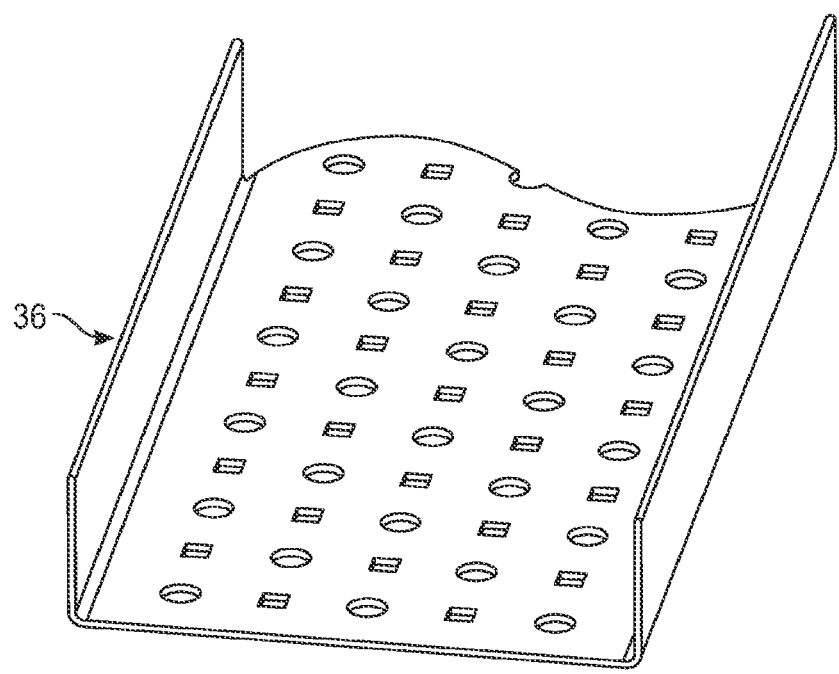
FIG. 3A
(Prior Art)
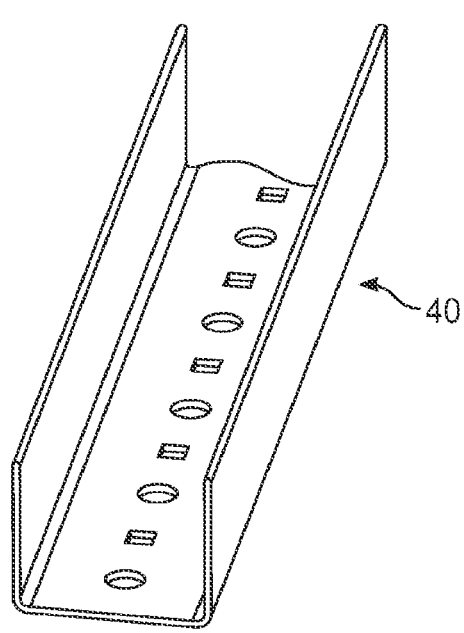 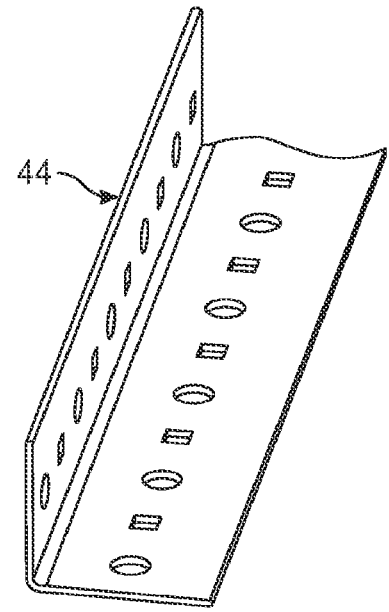
FIG. 3B
(Prior Art)
FIG. 3C
(Prior Art)

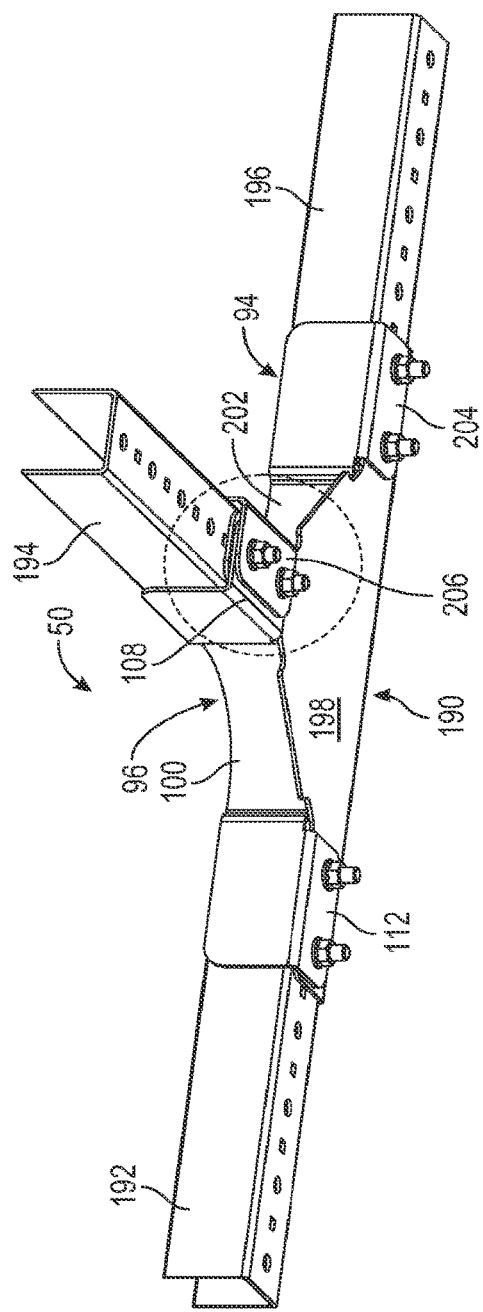
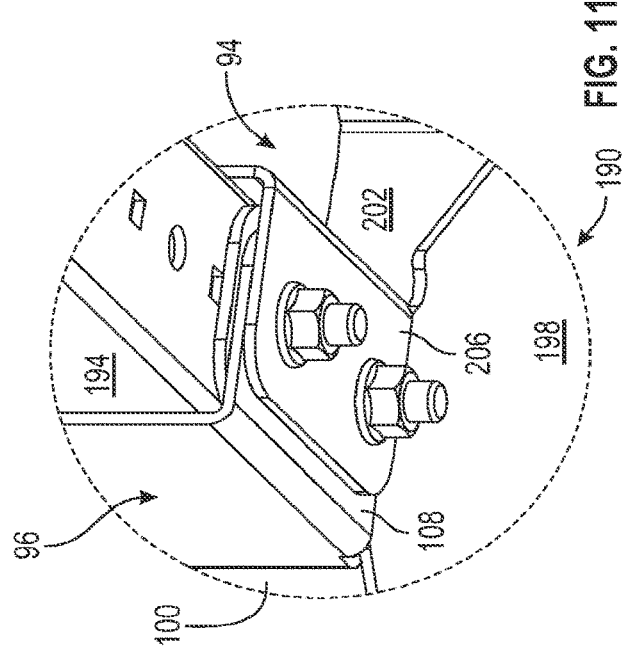

NON-WELDED HORIZONTAL CABLE TRAY REDIRECTOR

CROSS-REFERENCE TO RELATED APPLICATION

This application is a continuation application of U.S. patent application Ser. No. 17/498,924, filed Oct. 12, 2021, and entitled "A Non-Welded Horizontal Cable Tray Redirector" that is a continuation application of U.S. Pat. No. 11,171,470, filed Jun. 4, 2020, and entitled "A Non-Welded Horizontal Cable Tray Redirector." Accordingly, this application claims benefit of U.S. patent application Ser. No. 16/892,974 under 35 U.S.C. § 120. U.S. patent application Ser. No. 16/892,974, U.S. Pat. No. 11,171,470, and U.S. patent application Ser. No. 17,498,924 are incorporated herein in their entirety.

TECHNOLOGY FIELD

This disclosure relates to cable trays in general and, in particular, to components of cable trays that change the direction, or "redirect" a cable tray. An example of a cable tray redirector is found in U.S. Pat. No. 8,573,409, which is incorporated herein in its entirety by reference.

BACKGROUND

Cable trays are devices that support electrical cables. The term "cables" is intended broadly to include fiber optic cables, pipes, conduit, wiring, tubing, and the like, which may deliver electrical and optical signals, electricity, fluids, and data from one location to another. Cable trays can make it easier to install cables, to facilitate the connecting of cables, to locate and trace cables, and to replace, add or remove cables.

Plural cable tray components may be connected together to form runs. The runs are usually elevated so that the cables they carry are out of harm's way, and not an obstruction to people or vehicles and are well above standing water and stored items. It is often easier to install and trace cables when they are in cable tray runs that are overhead than when they are on the ground where they compete for floor space with vehicles, inventory, finished goods, and pedestrian pathways.

In many facilities, such as processing plants that include devices for instrument control and monitoring, cables can be so numerous that several tray runs may be required, some oriented in different directions and at different elevations, perhaps changing direction repeatedly in order to avoid walls, columns and other cable tray runs when proceeding to their various destinations in the facility.

Cable trays thus serve important purposes, particularly in plants requiring highly automated systems for monitoring and control such as, for example, office buildings, factories, warehouses, nuclear facilities, power plants and refineries.

Thus, cable trays and the components used with cable trays need to enable designers to create cable tray runs that can reach their destination without interfering with other structures, and with the ability to change direction as needed in order to get them to where they are intended to go.

A cable tray redirector, or simply a "redirector", as used herein, refers to a component of a cable tray run that changes the direction of the cable tray run in a horizontal plane. A redirector may enable some of the cables in a tray to change direction by 90 degrees, for example, as some cables in the same cable tray run may continue forward in the original direction while others are directed in yet a third direction.

More easily assembled, robust in operation, and economical cable tray redirectors would be an advantage in cable tray system design, construction and use. Better redirectors might have little or no welding requirements, use the same connecting fasteners as are commonly used to connect redirecting connectors to tray sections, and might be made of a metal that could be easily electrically grounded, not be bulky or difficult to store, package and ship, and could be used in a wide variety of cable tray applications.

SUMMARY

According to its major aspects and briefly recited, herein is disclosed a set of components that are used to assemble cable tray redirectors that are useful for redirecting cable tray runs. The components are connected using the same bolts and nuts throughout, and which are used in the present redirector kit to avoid welded joints or expensive manufacturing processes. Welding takes time and may be unsuitable in some facilities, such as nuclear power plants and process facilities or where there are seismic restrictions because of concerns for stress and corrosion. The components of the present redirectors are made of materials that preserve electrical conductivity throughout any cable tray run, which makes electrical grounding easier. Also, the present cable tray redirectors enable cable redirection to the left and to the right, or both, up to 90 degrees in a horizontal plane. In addition, unlike prior art redirectors, the major components of the present system are designed to "nest", which means that one component fits close to another of the same kind so that storage and shipping volumes are greatly reduced, requiring less warehouse, packaging or onsite space to maintain inventory. The fasteners used to assemble components are all interchangeable, too, so minimal numbers of part types need to be maintained.

Current or known cable tray redirectors are fabricated as a weldment or a press formed metal, fiberglass or plastic product. The present redirectors reduce costs by eliminating welding time and excessive costs of press-forming and drawing tools. The present redirector is manufactured and assembled without welding.

A feature of the present disclosure is a redirector that connects mechanically to straight tray sections. The present redirector requires no welding for connection to cable tray sections. The present redirector comprises multiple components, which are assembled using the same fasteners that connect the redirector kit to straight tray sections, using fasteners common to cable tray construction. In fact, the same number and type of fasteners required to connect a prior art welded redirector to cable trays is required for the assembly of the present redirecting kit to cable trays. Welding is eliminated without adding the cost of material and time to assemble the present redirectors to cable trays.

Those skilled in the construction and operation of cable trays and redirectors will appreciate these and other features and their advantages from a careful reading of the Detailed Description, accompanied by the following drawings.

BRIEF DESCRIPTION OF THE DRAWINGS

FIGS. 3A, 3B, and 3C, respectively, show perspective views of sections of a wide prior art cable channel tray (FIG. 3A), a narrow prior art cable channel tray (FIG. 3B); and a prior art L-shaped cable tray having one wall (FIG. 3C), wherein each tray has at least one row of holes for mounting clamps and guides to control the cables in the bed of the respective tray and for connecting tray sections and redirectors;

FIG. 10 is a bottom perspective view of a T-redirector assembly for a narrow tray with one curved flange fitting of FIG. 5A, one curved flange fitting of FIG. 5C and three narrow cable trays of FIG. 3B fastened to a T-redirector base, according to an aspect of the disclosure;

FIG. 11 is a detailed view of the overlapping flanges of the two curved flange fittings of the T-redirector of FIG. 10;

DETAILED DESCRIPTION

Figure 1:
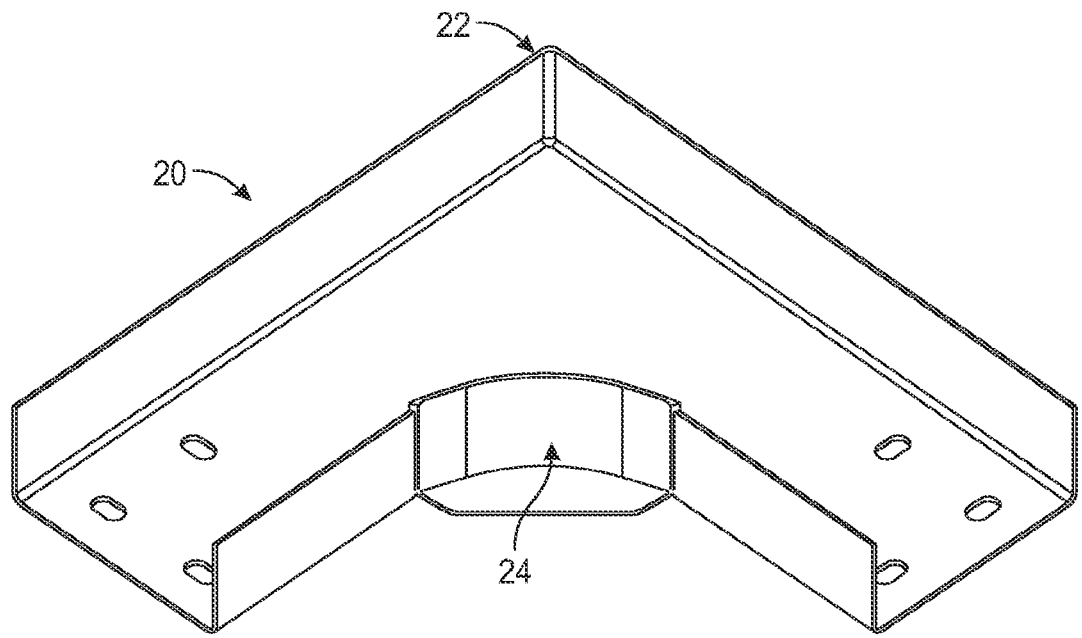
FIG. 1 is a perspective view of a prior art cable tray redirector for redirecting the horizontal course of a cable tray run by 90-degrees.
Figure 2:
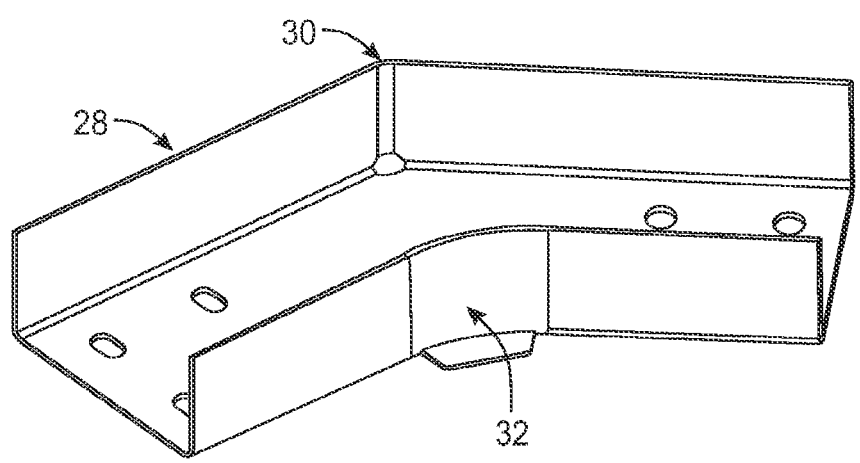
FIG. 2 is a perspective view of another prior art cable tray redirector for redirecting the horizontal course of a cable tray run by 45-degrees.

Referring now to the drawings, FIGS. 1 and 2 show two prior art cable tray redirectors, and FIGS. 3A, 3B, and 3C show prior art cable trays that can be attached to the prior art cable tray redirectors of FIGS. 1, 2.

FIG. 1, in particular, shows a redirector 20 with a curved (90-degree arc) wall 24. FIG. 2 shows a redirector 28 with a curved (45-degree arc) wall 32. Both 90-degree redirector 20 and 45-degree redirector 28 have welded corners 22, 30, respectively, and welded inside flanges 24, 32.

Cable trays of various widths, such as those shown in the three prior art examples of FIGS. 3A, 3B, and 3C, can be attached to either end of a compatible 90-degree redirector or 45-degree redirector using the required number of bolts per cable tray. Wide cable trays such as those shown in FIG. 3A can be attached to either end of 90-degree redirector 20 or 45-degree redirector 28 using four bolts per cable tray as required. The choice of cable tray will depend on the number and sizes of cables the tray is intended to carry. For example, a wide tray 36 as shown in FIG. 3A would be used to hold several cables or larger cables, a narrow tray 40 as shown in FIG. 3B would be selected when there are fewer cables or smaller cables to be carried. The cable tray 44 in FIG. 3C is for carrying a single cable or guided or clamped cables, bundles or tubes, and the like.

The term "cable" will be used herein to indicate anything carried by a cable tray; including wiring, electrical cables, telephone cables, pipes for fluid delivery, pneumatic tubing, optical fibers, optical fiber bundles, and the like. The term "tray" or "cable tray" refers to a metal tray with a floor and a wall on at least one side of the floor. The tray serves as a physical support and confinement for at least one cable running from one end of the tray to the other.

Redirectors 20 and 28 and cable trays 36, 40, and 44 may have round, square, slotted, or a combination of round, square, and slotted holes formed therein to received various types of fasteners (not shown in FIGS. 1-5) that keep cables in place such as clamps or guides and for connecting tray sections and redirectors.

Figure 4:
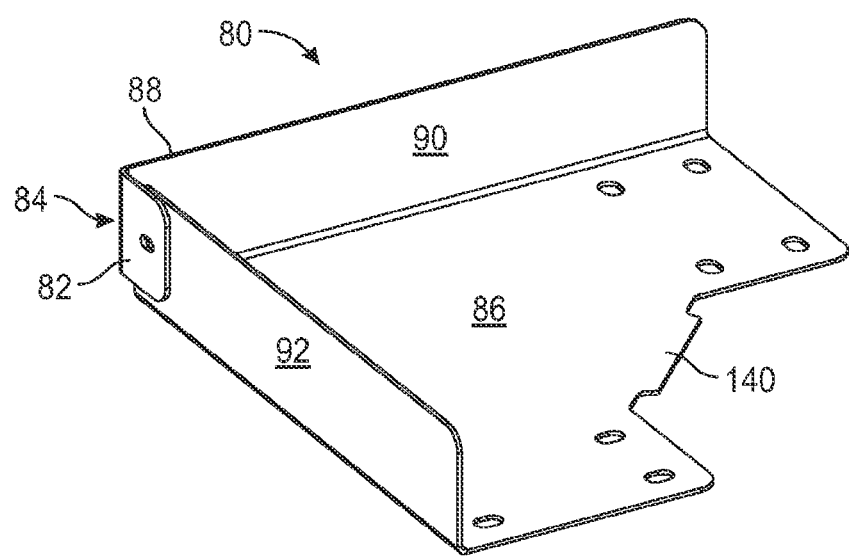
FIG. 4 is a perspective view of a horizontal 90-degree redirector base, according to an aspect of the disclosure.

An example of a horizontal 90-degree redirector base 80, according to the present disclosure, is shown in perspective in FIG. 4. Horizontal 90-degree redirector base 80 includes a wall 88 made by cutting and forming a blank sheet of metal to have a first side 90 that is longer than an adjacent, second side 92. When both first side 90 and second side 92 are bent by 90 degrees with respect to deck 86, the end 82 of first side 90 will be longer than that of the second side 92 and can be folded against second side 92. End 82 of first side 90 and the corresponding part of second side 92 against which end 82 is folded can then be predrilled to make a pair of aligned holes 142 for receiving a fastener, such as a bolt 162 and nut 164 or rivet to hold end 82 to second side 92. A nut tightened to the end of that bolt through the aligned holes reliably holds side 90, to side 92 and secures corner 84 and the outside wall 88 of the 90-degree redirector base 80 seen in FIG. 7A and FIG. 7B. In larger redirectors multiple fasteners may be necessary to hold end 82 to second side 92.

Figure 5A:
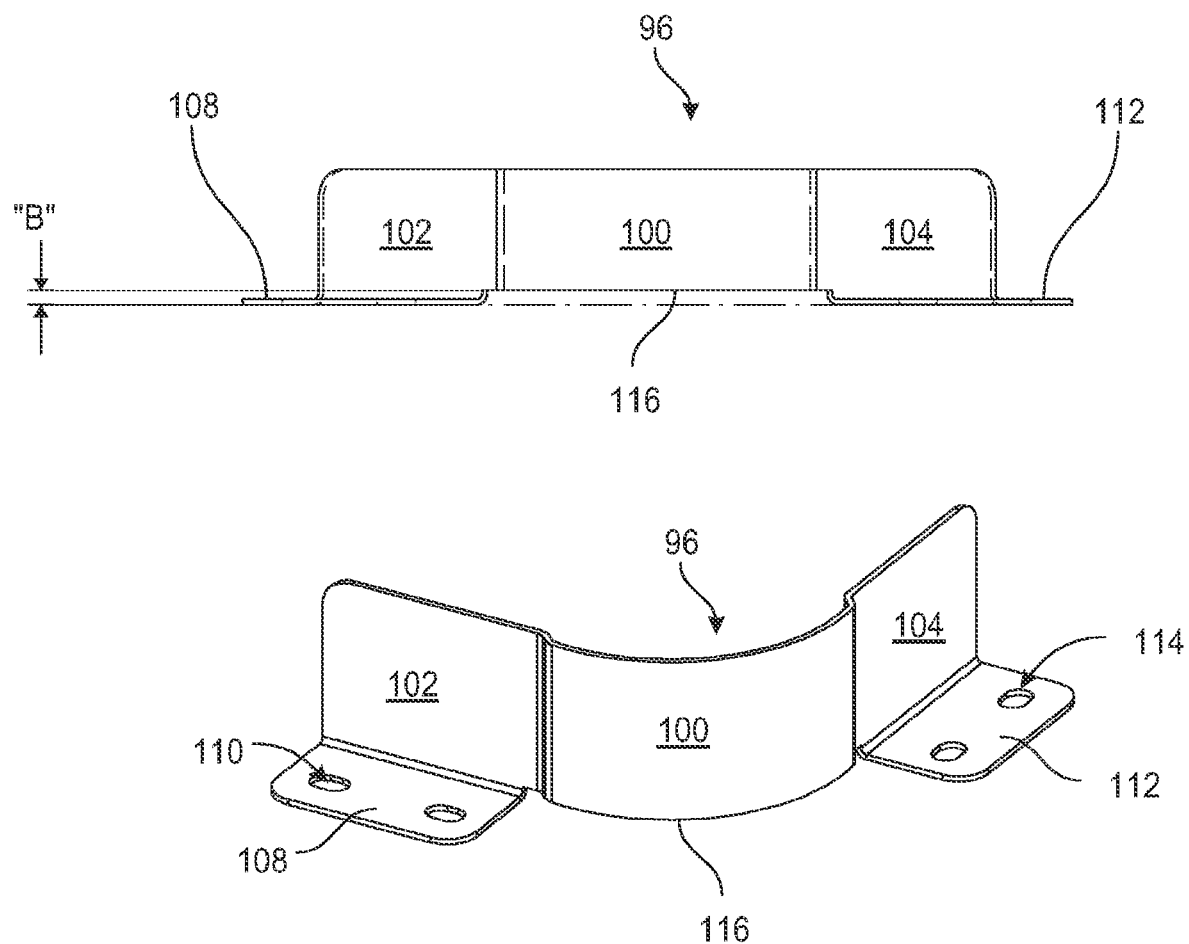
FIG. 5A shows an elevation view and a perspective view of a 90-degree curved flange fitting with connecting flanges for use with the redirector base shown in FIG. 4, according to an aspect of the disclosure.
Figure 5B:
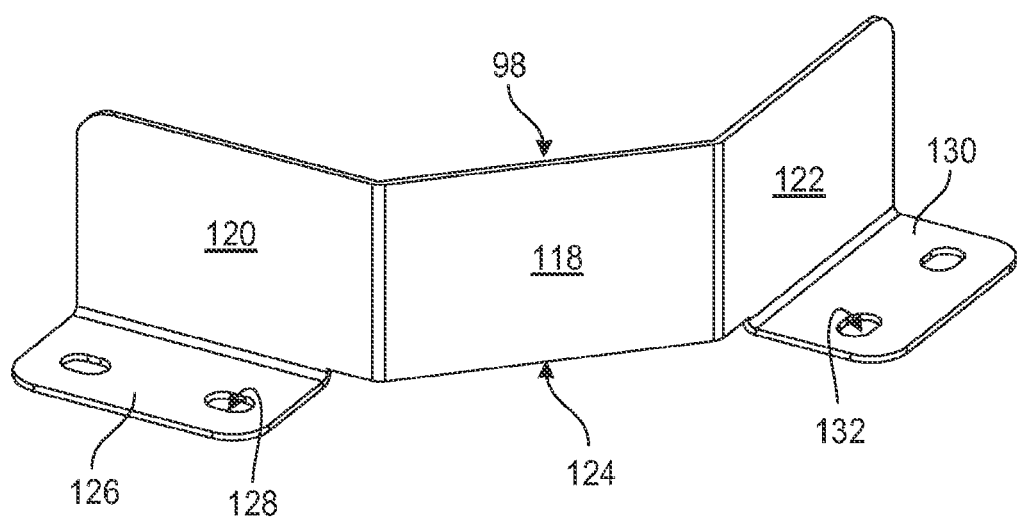
FIG. 5B shows a perspective view of a 90-degree diagonal straight flange fitting with connecting flanges for use with the redirector base shown in FIG. 4, according to an aspect of the disclosure.

Deck 86 of FIG. 4 includes a tab 140 that will engage one curved flange fitting 96 or straight diagonal flange fitting 98, shown in FIGS. 5A and 5B, respectively. FIG. 5A is a perspective view of a curved flange fitting 96; FIG. 5B shows a straight diagonal flange fitting 98. Both curved flange fitting 96 and diagonal flange fitting 98, as shown, facilitate a cable redirection of 90 degrees, for the sake of the present example. Both curved flange fitting 96 and diagonal flange fitting 98 as shown are interchangeable within the same size and type of cable tray and angle of redirection. Those of ordinary skill will readily recognize that other angles for redirection are readily obtainable.

Referring specifically to FIGS. 4 and 5A, deck 86 of redirector 80 of FIG. 4 may receive a curved flange fitting 96 onto tab 140. Curved flange fitting 96 includes a curved portion 100, a first end 102 and a second end 104. First end 102 carries a first flange 108 with at least one hole 110 formed therein. Second end 104 carries a second flange 112 with at least one hole 114. Holes 110, 114, that are provided for attaching curved flange fitting 96 onto tab 140 of deck 86, are preferably slotted holes to provide flexibility for connecting industrial components together.

As an alternative to curved flange fitting 96, a diagonal flange fitting 98 may be used. As shown in FIG. 5B, straight diagonal flange fitting 98 includes a diagonal portion 118, a first end 120 and a second end 122. Diagonal portion 118 meets first end 120 and second end 122 at angles of 45 degrees, which together generate the 90-degree redirection of diagonal flange fitting 98. First end 120 has a first flange 126 with at least one hole 128; and second end 122 has a second flange 130 with at least one hole 132. Curved flange fitting 98 of FIG. 5B attaches to tab 140 of deck 86 essentially in the same manner as would curved flange fitting 96 of FIG. 5A.

Also, referring to FIG. 5A, the elevation view of curved flange fitting 96 shows first flange 108 and second flange 112. First flange 108 and second flange 112 elevate the bottom 116 of curved portion 100 so it clears the top of tab 140 of deck 86 of FIG. 4 when curved flange fitting 96 is being attached to deck 86, and likewise, referring to FIG. 5B the elevation view of straight diagonal flange fitting 98 shows first flange 126 and second flange 130. First flange 126 and second flange 130 elevate the bottom 124 of diagonal portion 118 so it clears tab 140 of deck 86 of FIG. 4 when diagonal flange fitting 98 is being attached to deck 86. The elevation of the curved portion 100 or diagonal portion 118 of each curved flange fitting 96 or diagonal flange fitting 98 enables curved portion 100 and diagonal portion 118 to fit above tab 140 of FIG. 4, respectively, and is a feature of the present disclosure.

Figure 5C:
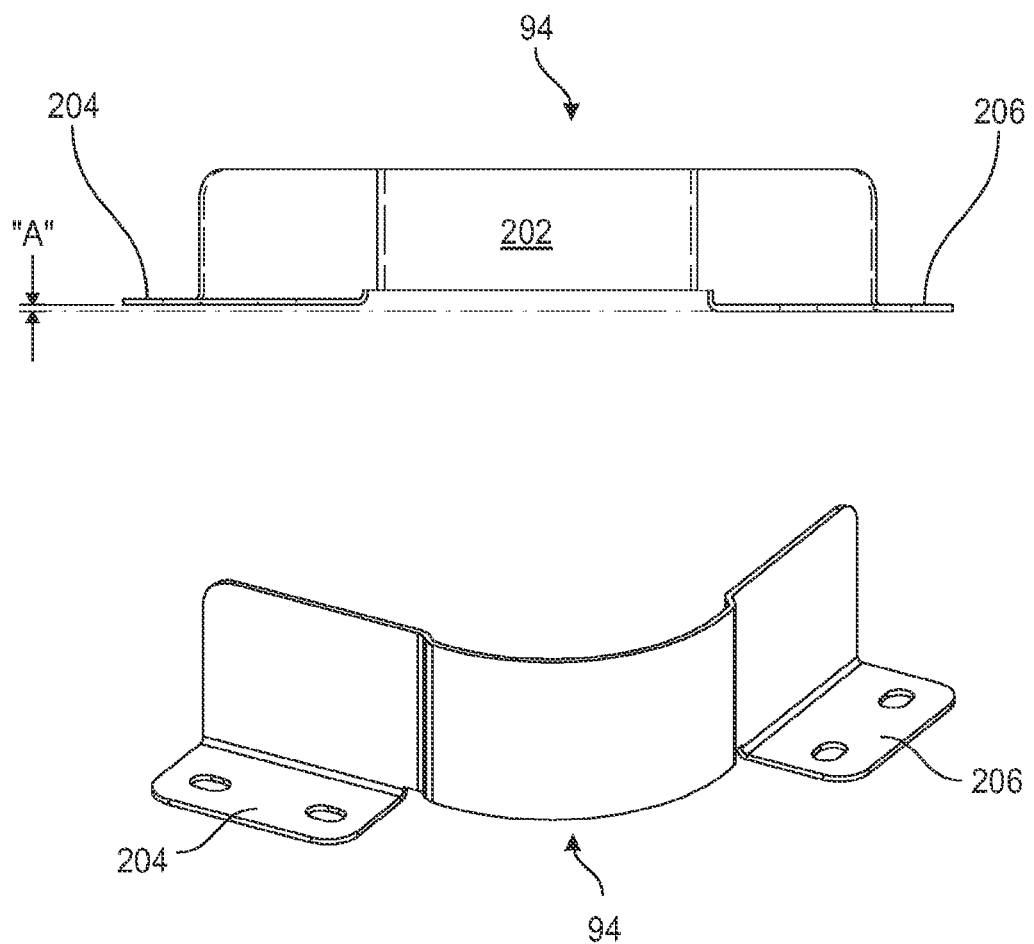
FIG. 5C fitting, shows an elevation view and a perspective view of a 90-degree curved flange fitting similar to FIG. 5A, but with offset connecting flanges for use with a narrow redirector connecting more than two trays, according to an aspect of the disclosure.

FIG. 5C shows an elevation view and a perspective view of the curved flanged fitting 94, similar to that shown in FIG. 5A, which shows first flange 204 and second flange 206. Second flange 206 is at an elevation one metal material thickness (dimension A) lower than flange 204. The elevation difference allows a flange 206 to be stacked below another flange of an adjacent curved flange fitting for a narrow multi-tray redirector (tee or cross redirector) having a single row of holes, as shown in FIG. 10 and FIG. 11.

Figure 5D:
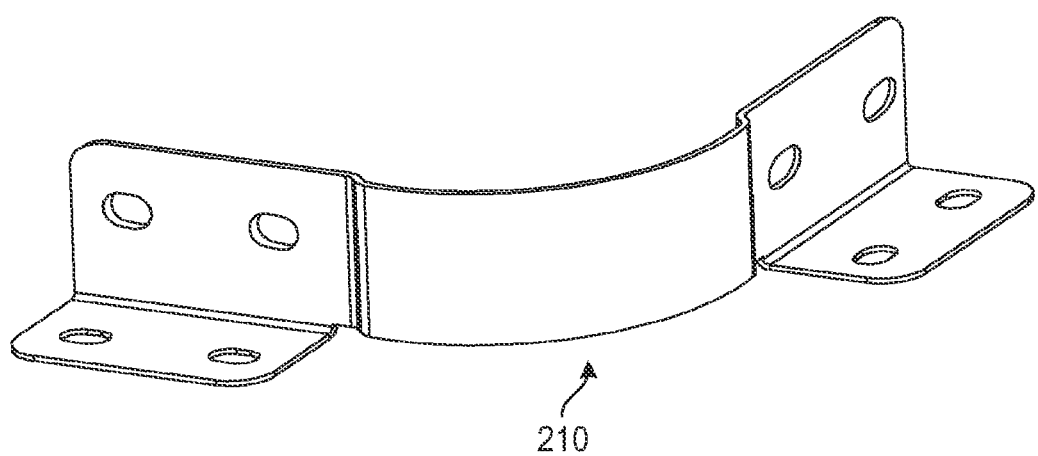
FIG. 5D shows a perspective view of a 90-degree curved flange fitting with connecting flanges for use with an L-shaped tray redirector base connecting two L-shaped trays, according to an aspect of the disclosure.
Figure 12A:
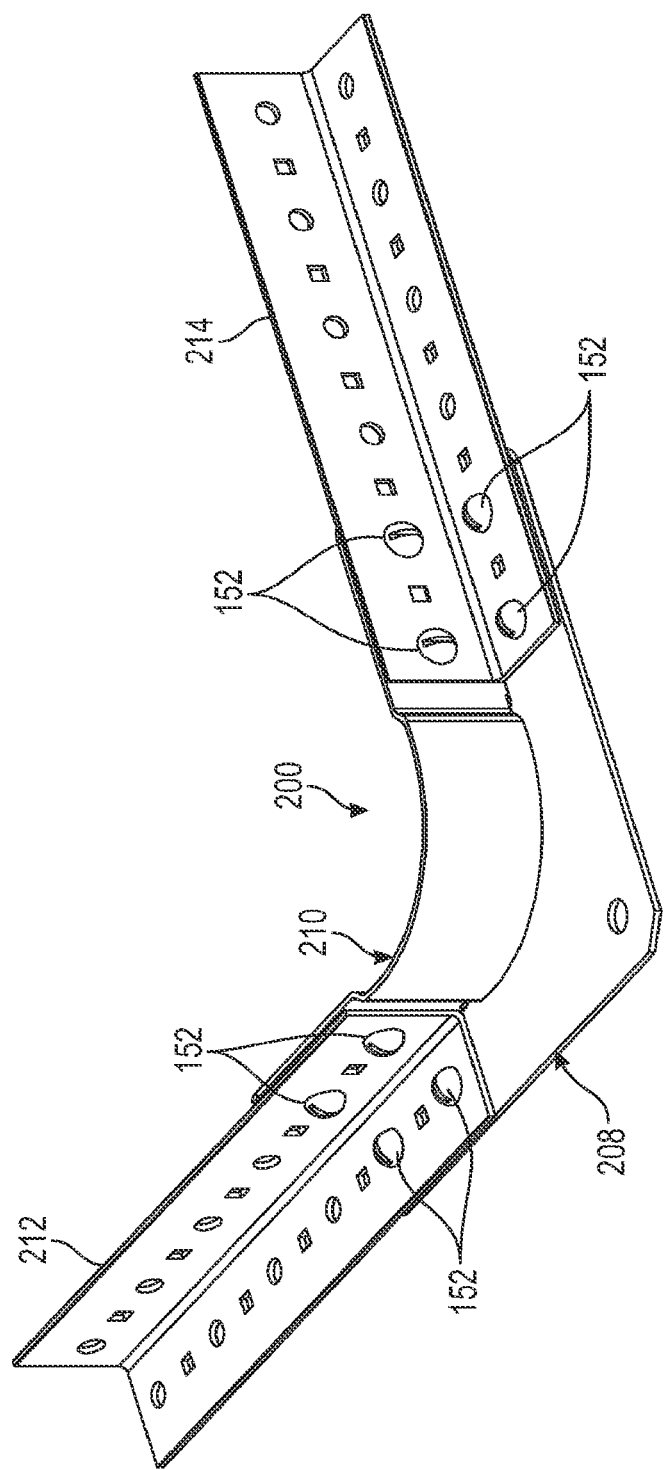
FIG. 12A is a perspective bottom view of a 90-degree redirector assembly with one curved flange fitting of FIG. 5D, two L-shaped trays of FIG. 3C fastened to a flat 90-degree redirector base, according to an aspect of the disclosure.
Figure 12B:
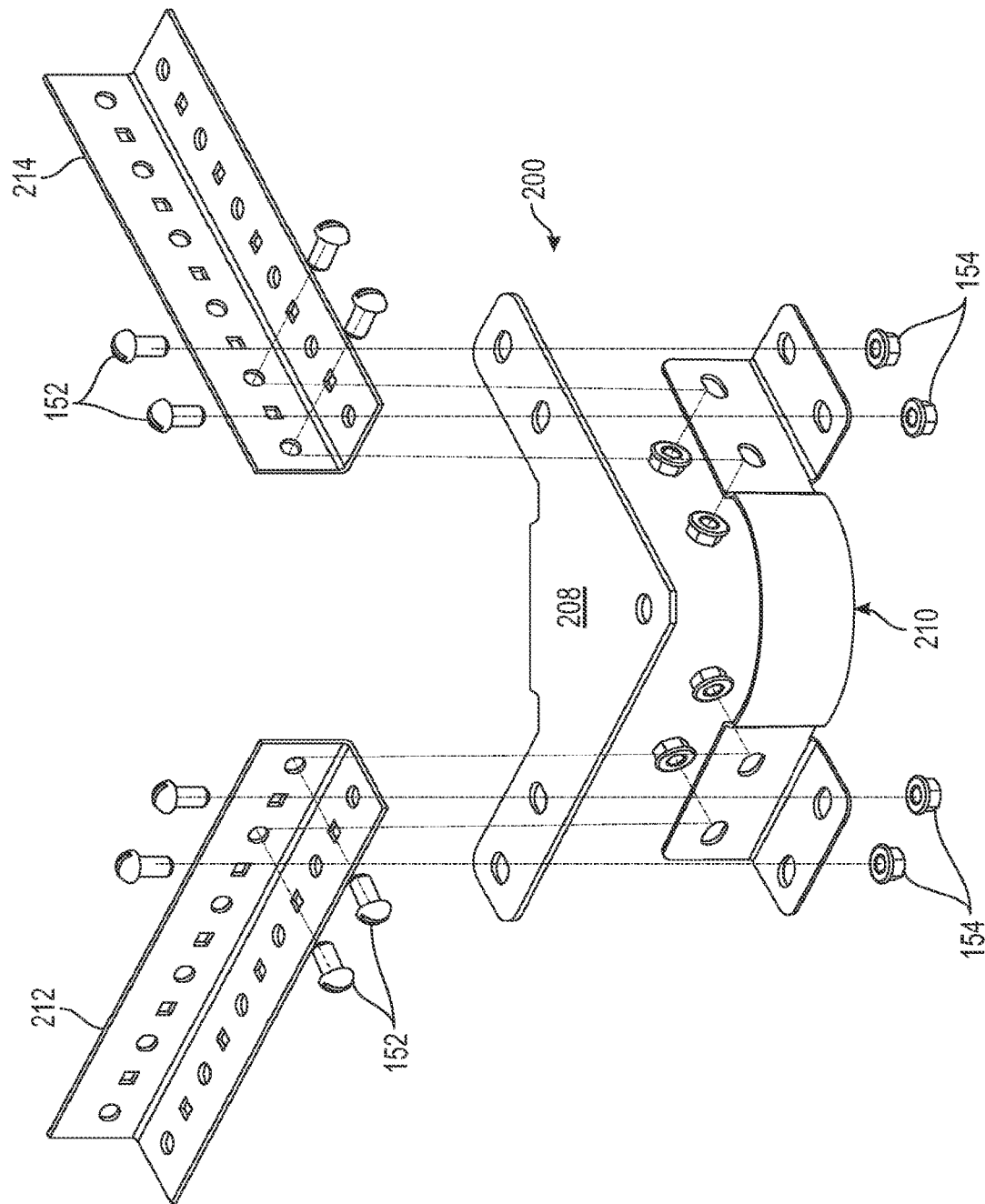
FIG. 12B is an exploded, perspective, top view of the horizontal redirector base, with the curved flange fitting of FIG. 5D, with L-shaped cable trays of FIG. 3C to be assembled with bolts and nuts, according to an aspect of the disclosure.

FIG. 5D shows a curved flanged fitting 210, similar to that shown in FIG. 5A, except that curved flange fitting has additional mounting holes for connecting with both legs of each L-shaped tray as shown in FIG. 12A and FIG. 12B.

Figure 6A:
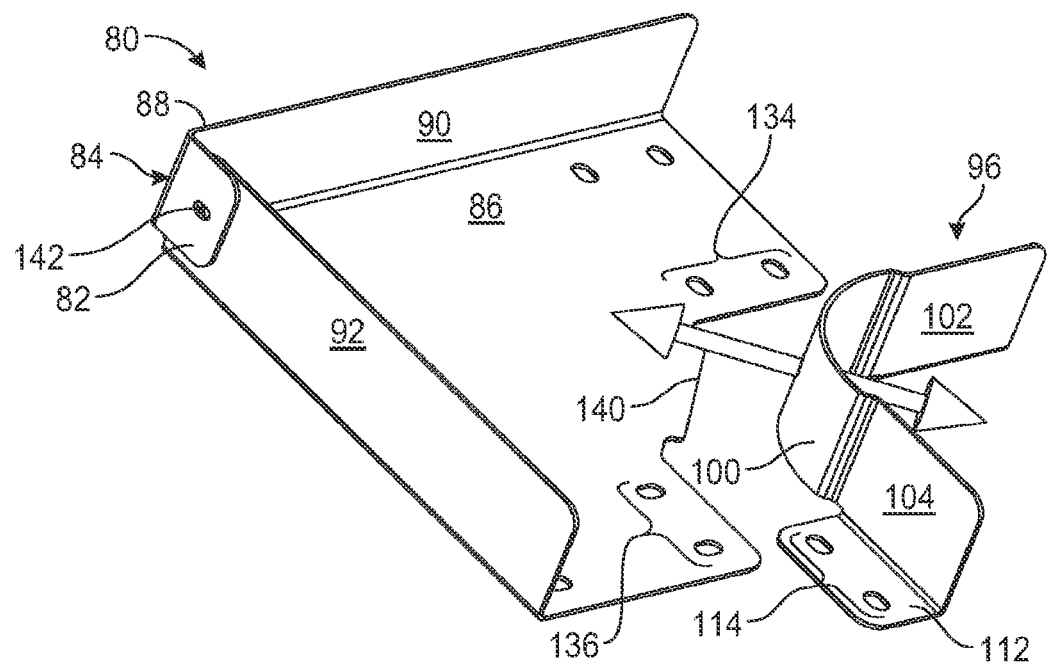
FIG. 6A shows an exploded, perspective view of a 90-degree horizontal redirector with a curved flange fitting in position to be joined to its base, according to an aspect of the disclosure.
Figure 6B:
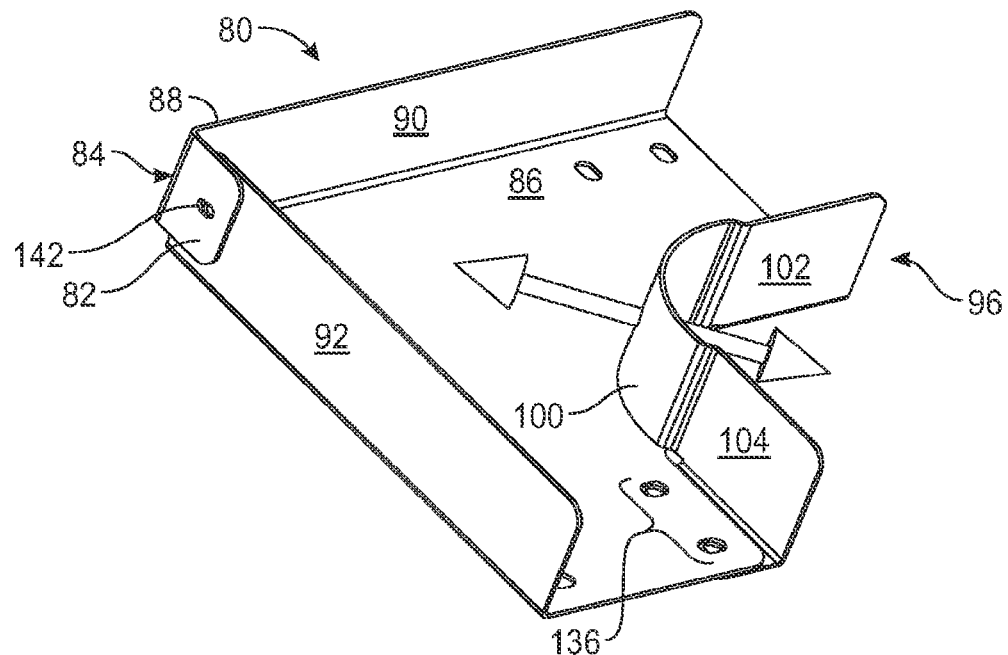
FIG. 6B shows an assembled, perspective view of the redirector of FIG. 6A with a curved flange fitting set into position to be fastened to its base, according to an aspect of the disclosure.

FIGS. 6A and 6B, show overhead perspective views to illustrate moving curved flange fitting 96 into position onto deck 86 of redirector base 80 to form a 90-degree redirector of the present disclosure. Curved flange fitting 96 is moved toward deck 86, with tab 140 centered so it can slide between first flange 108 and second flange 112. First flange 108 and second flange 112 slide under deck 86 as curved portion 100 slides over tab 140 of deck 86 and is positioned so that holes 134, 136, in deck 86 are aligned with at least one hole 110 in first flange 108 or at least one hole 114 in second flange 112, respectively.

Figure 6C:
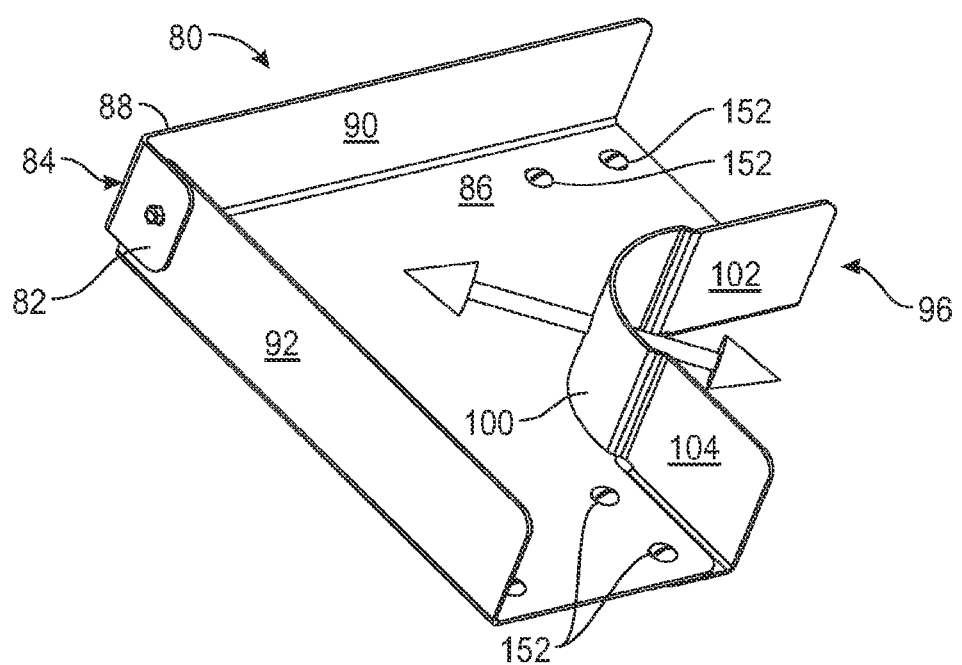
FIG. 6C shows an assembled, perspective view of the redirector of FIG. 6A with a curved flange fitting set into position and fastened to its base, according to an aspect of the disclosure.

FIG. 6C shows a completely assembled 90-degree wide tray redirector. All of the components: redirector base 80, curved flange fitting 96, eight sets of fasteners (bolts and nuts) and corner fastener comprise a 90-degree redirector kit for connecting two wide trays (not included as part of the kit).

Figure 7A:
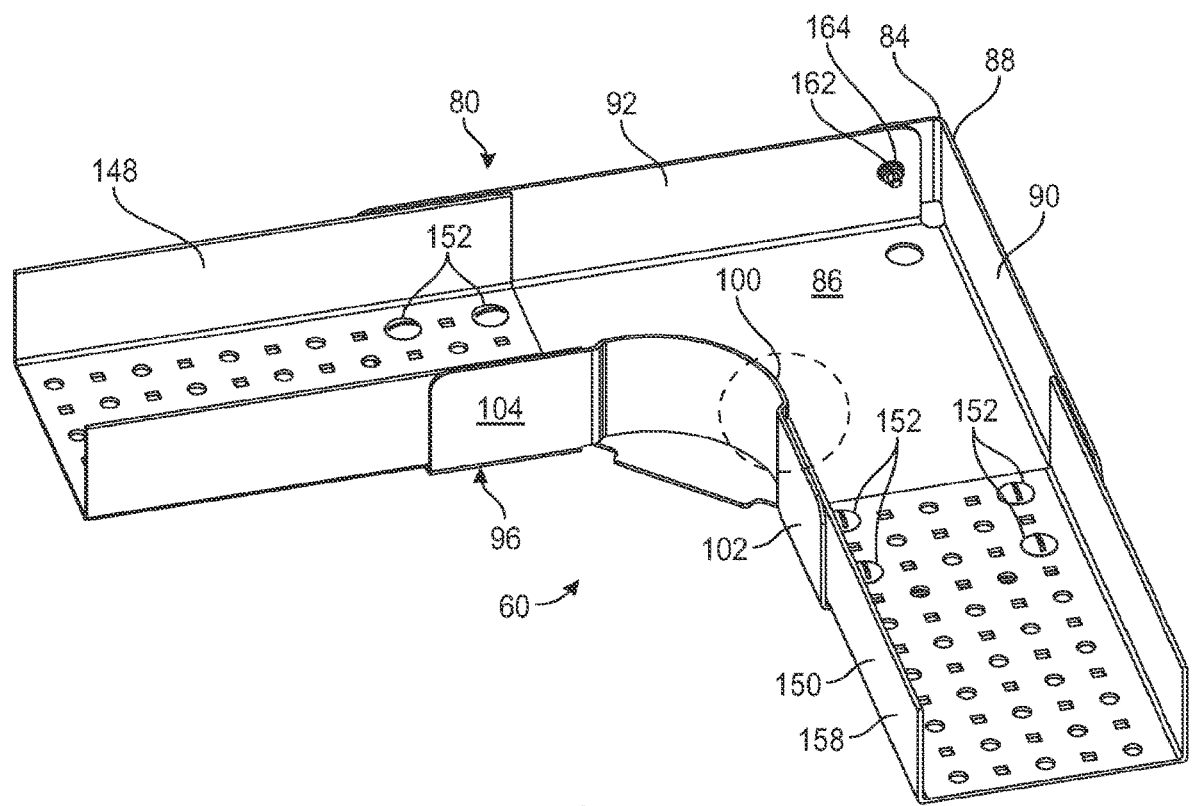
FIG. 7A is a top perspective view of a 90-degree horizontal redirector assembly with a curved flange fitting FIG. 5A, and two wide cable trays FIG. 3A bolted to the redirector base FIG. 4 and extending at right angles with respect to each other, according to an aspect of the disclosure.
Figure 7C:
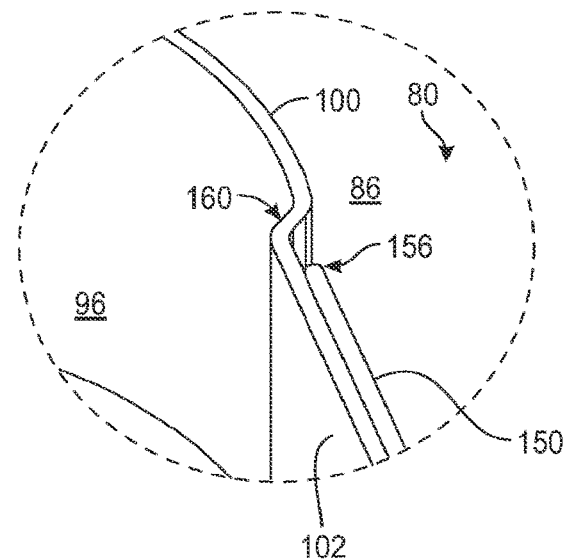
FIG. 7C is a detail of the view shown in FIG. 7A showing the physical relationship between the curved flange fitting of FIG. 5A and the adjacent cable tray wall, according to an aspect of the disclosure.
Figure 7B:
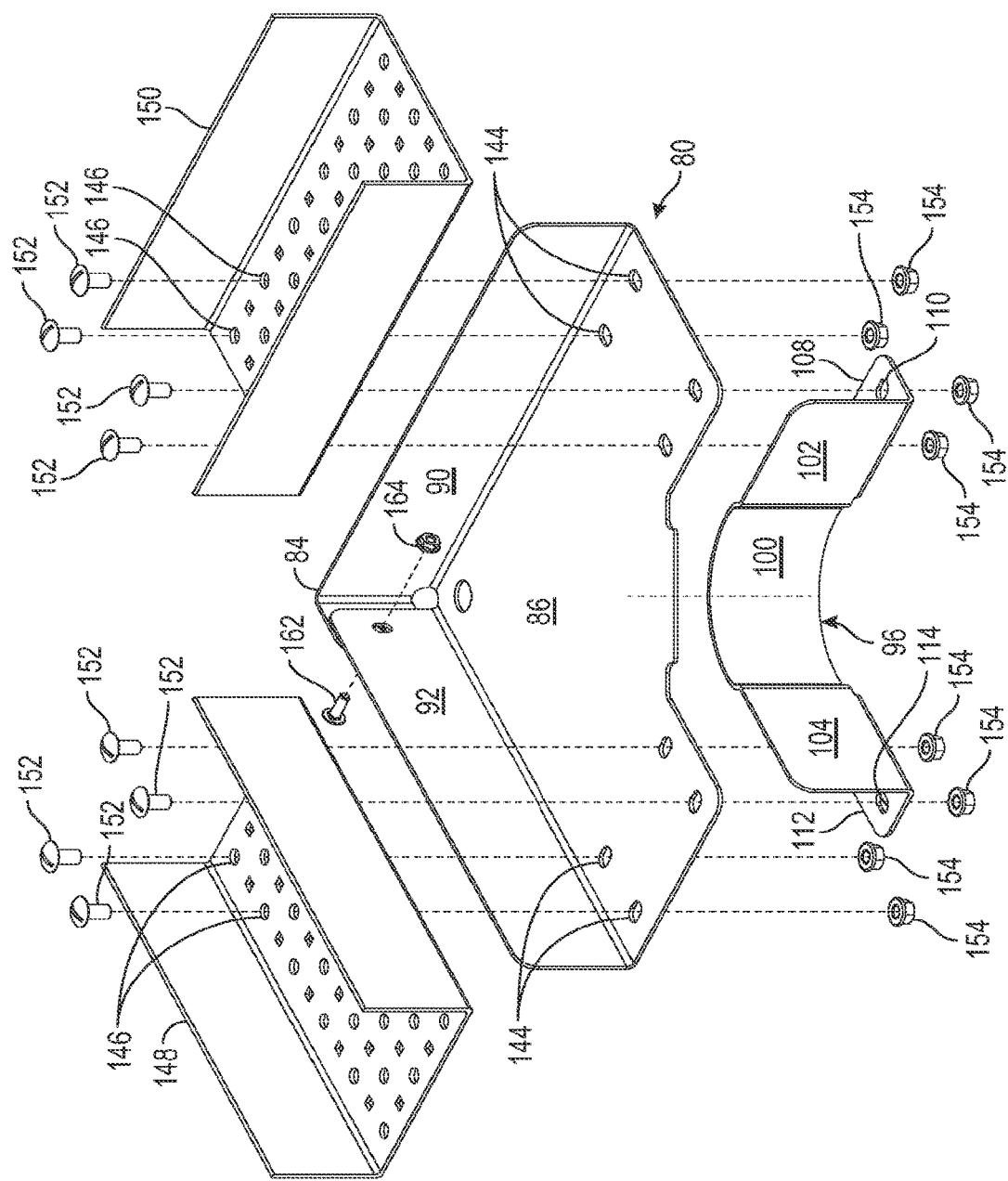
FIG. 7B is an exploded, perspective, view of the horizontal redirector base of FIG. 4, with a curved flange fitting of FIG. 5A, with two wide cable trays of FIG. 3A to be attached with bolts and nuts, according to an aspect of the disclosure.
Figure 7D:
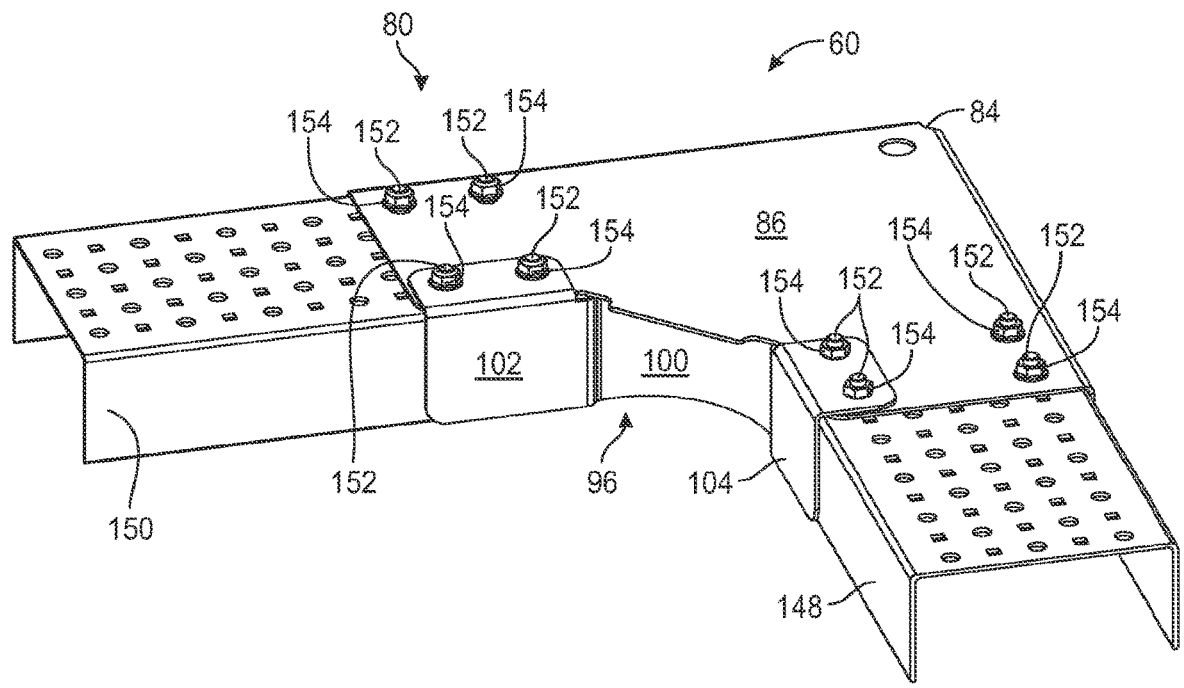
FIG. 7D is a bottom perspective view of the 90-degree horizontal redirector assembly of FIG. 7A, according to an aspect of the disclosure.

FIGS. 7A, 7B, 7C and 7D show detailed perspective views of a cable tray 90-degree redirector assembly 60 with wide tray sections. FIG. 7A shows a top prospective view of a 90-degree redirector assembly 60 with two connected wide trays. FIG. 7B is an exploded view of the 90-degree redirector assembly 60 to detail all components and alignment for assembly, FIG. 7C details an offset or curb feature that can be included in the design of a curved flange fitting 96 and its relationship to protect the end of an adjacent tray wall, FIG. 7D shows a bottom view of the 90-degree redirector assembly 60. In FIG. 7A, FIG. 7B, and FIG. 7D bolts 152 and nuts 154 are used to connect first cable tray 148 and second cable tray 150 through holes 146 and holes 144 to deck 86 of redirector base 80. In particular, four bolts 152 and four nuts 154 are used to hold tray 148 to deck 86 of redirector base 80 and four bolts 152 and four nuts 154 are used to hold tray 150 to deck 86 of redirector base 80. Half of said same eight bolts 152 and eight nuts 154 are also used to connect 90-degree curved flange fitting 96 through holes 110 and holes 114 to deck 86 of redirector base 80 as clearly displayed in FIG. 7D.

It should be noted that in FIG. 1 a total of eight bolts and nuts are needed to hold two cable trays to a prior art 90-degree, welded cable tray redirector. FIGS. 7A, 7B and 7D show the same number: eight bolts and nuts, used to hold two cable trays to the present, 90-degree curved flange fitting 96 the redirector base 80 without any welding needed to complete the cable tray redirector components or assembly. The cost and time to weld horizontal cable tray redirectors has been completely avoided. Cables (not shown) may be placed onto redirector 80 beginning at first cable tray 148, then across deck 86 and onto second cable tray 150. First cable tray 148 and second cable tray 150 are secured to redirector base 80 using bolts 152 entering from the inside of first and second cable trays 148 and 150, respectively, and being fastened with nuts 154 from below the cable tray redirector.

As cables are pulled through redirector 80 from first cable tray 148 to second cable tray 150, they tend to reduce their radius when changing direction and to move radially inward toward curved flange fitting 96, in this example. The convex curved surface of portion 100 of curved flange fitting 96 helps facilitate their movement and limit further tightening that might damage cables.

FIG. 7C shows a detail of the juncture 160 between curved portion 100 and first end 102 of curved flange fitting 96 and the end of the adjacent wall 158 of second cable tray 150. The slight inward offset at the juncture 160 between curved portion 100 and first end 102 of curved flange fitting 96 provides a smooth transition and shields the inside corner 156 of wall 158 at the curve, thereby helping to avoid having wall 158 extending into the path of a cable as it rounds curved portion 100 and reducing the probability of cable damage by providing a smoother transition between the connected cable tray wall and a curve in a tray redirector assembly. Offsets may be applied at both ends of each 90-degree flange fitting where there is a transition between a redirector assembly and a cable tray.

FIG. 7B shows an exploded perspective view that clearly displays the components and assembly of a 90-degree redirector for redirecting wide cable tray 90-degrees in either direction.

FIG. 7D shows a bottom perspective view of the 90-degree horizontal redirector assembly 60 of FIG. 7A that more clearly displays the assembly of a curved flange fitting 96 to the deck 86 of 90-degree redirector base 80 using eight bolts 152 and eight nuts 154, the same bolts 152 and nuts 154 securing the wide cable trays 148 and 150 to the 90-degree redirector.

Figure 8:
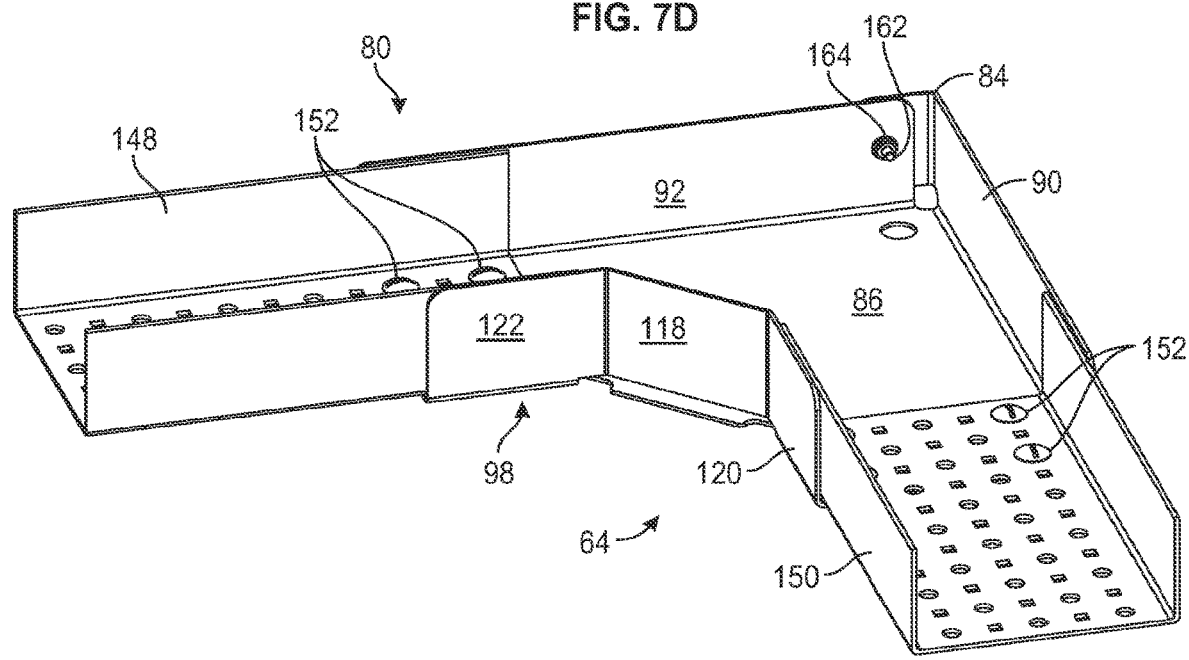
FIG. 8 is a, perspective view of a 90-degree horizontal redirector assembly with diagonal straight flange fitting of FIG. 5B, and two wide cable trays, according to an aspect of the disclosure.

FIG. 8 shows a perspective view of 90-degree redirector assembly 64 with a diagonal flange fitting 98 (substituted for a curved flange fitting 96) connected to a 90-degree redirector base 80 with bolts 152 and nuts 154 used for assembly.

Figure 9:
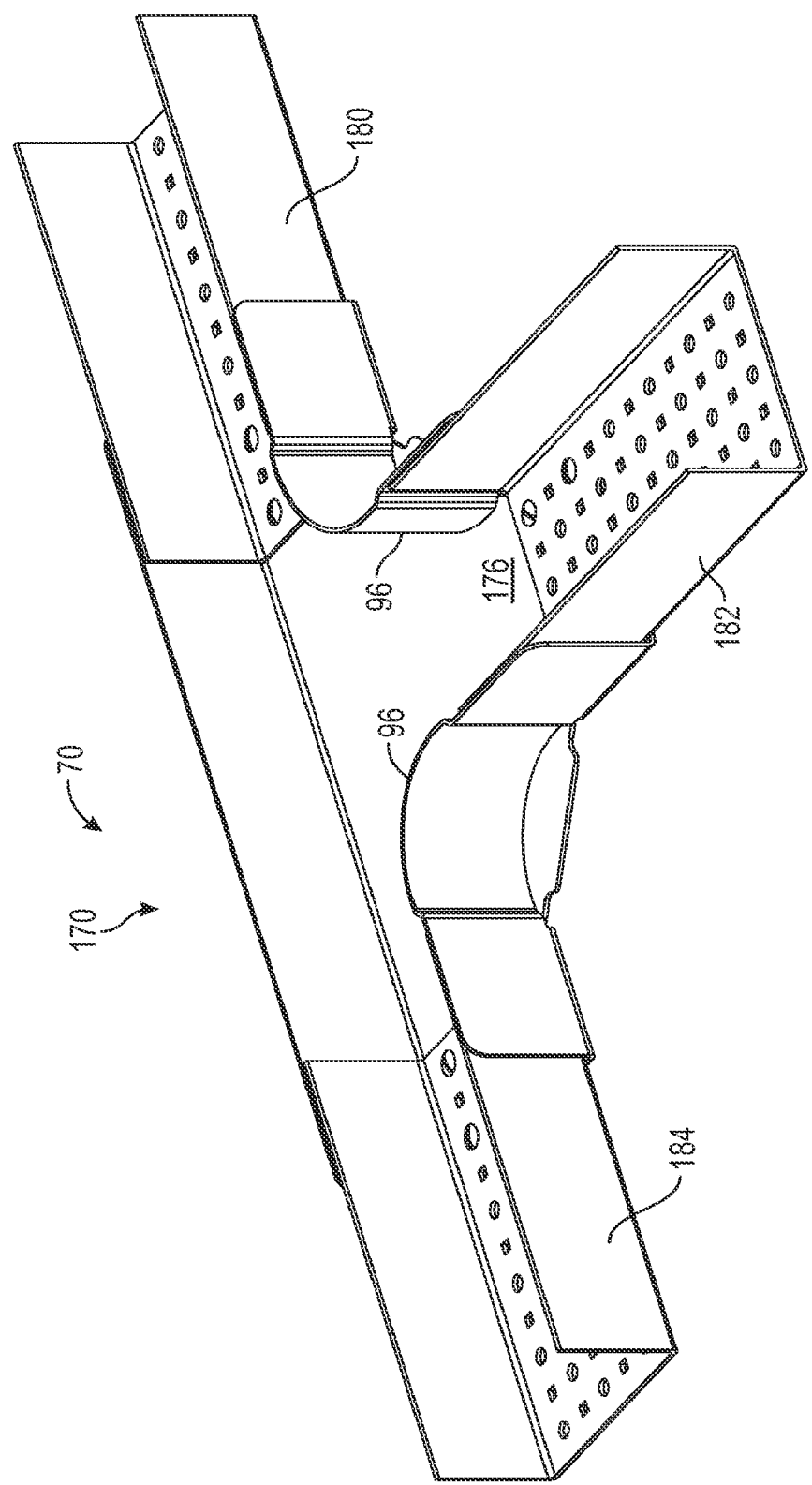
FIG. 9 is a top perspective view of a horizontal T-redirector assembly with the two curved flange fittings of FIG. 5A, and three wide cable trays of FIG. 3A, fastened to a T-redirector base, according to an aspect of the disclosure.

FIG. 9 shows a perspective view of a horizontal T-redirector assembly 70 with a base 170 and two curved flange fittings 96: first curved flange fitting 96 and second identical curved flange fitting 96, in cooperation with T-redirector base 170 facilitate joining three intersecting cable trays, namely, tray 180, tray 182, and tray 184. One T-redirector base 170, two 90-degree curve flange fittings 96 with bolts and nuts are provided as a T-redirector kit. The T-redirector kit is field-assembled with intersecting cable trays 180, 182, 184.

Similarly, a wide cable tray cross redirector featuring a flat cross redirector base, with four identical 90-degree curved flange fittings 96 and sixteen bolts with nuts make up a wide cable tray cross redirector kit. The wide tray cross redirector kit can be connected to four intersecting wide cable trays. Generally, identical curved flange fittings 96 are consistently incorporated throughout all wide cable tray redirectors of the same radius bend, within a cable tray run of a consistent tray pattern, a feature of the present disclosure.

Where cable tray redirectors may be needed for a special or modified configuration in smaller quantities to satisfy a customer's specific requirement for a cable tray arrangement, the general design features of the present disclosure have an economic advantage for design and fabrication.

FIG. 10 shows a perspective view from below of a narrow cable tray T-redirector assembly 50 similar to the wide tray T-redirector of FIG. 9. Unlike intersecting cable trays 180, 182, 184, attached to the wide cable tray T-redirector of FIG. 9, FIG. 10 shows three narrow cable trays: a first narrow cable tray 192, a second narrow cable tray 194, and a third narrow cable tray 196, attached to redirector base 190. A detail of FIG. 10 is shown in FIG. 11. In FIG. 11, base 190 connects to a first curved flange fitting 96 of FIG. 5A and to a second curved flange fitting 94 of FIG. 5C. Each of first curved flange fitting 96 and second curved flange fitting 94 includes a flange 108, and a flange 206, respectively, supporting narrow cable tray 194. Deck 198 of redirector base 190 is in direct contact with narrow cable tray 194. Flange 108 is below and in direct contact with deck 198 and flange 206 overlaps and is directly below flange 108. FIG. 5A shows a curved flange fitting 96 having two flanges 108 and 112 aligned along the same plane. As described in FIG. 5C curved flange fitting 94 having two flanges 204 and 206 on two parallel planes separated by the material thickness of flange 204 (flange 108 being of the same material thickness as flange 204) where flange 206 is the one flange thickness below flange 204. The elevation differences between flange 204 and flange 206 allow for the stacking of flange 206 below flange 108, which is made necessary when a narrow cable tray has only one row of mounting holes. For standard cable tray redirectors of the present disclosure, the use of a curve flange fitting 94 of FIG. 5C is only required for narrow cable tray redirectors that connect to three or more narrow cable trays ("T" and "cross" redirectors).

Similarly, a narrow cable tray cross redirector featuring a flat cross redirector base, with four identical 90-degree curved flange fittings 94 of FIG. 5C and 8 bolts with nuts make up a narrow cable tray redirector kit. The cross narrow tray redirector kit can be connected to 4 intersecting narrow cable trays.

FIG. 12A shows a 90-degree redirector assembly 200 to which is connected two L-shaped cable trays, namely, L-shaped cable tray 212 and L-shaped cable tray 214. One 90-degree flat redirector base 208, one curved flange fitting 210 of FIG. 5D and eight bolts 152 and nuts 154 make up a 90-degree redirector kit for L-shaped cable trays. The 90-degree redirector kit for L-shaped cable trays connect to cable trays 212 and 214 using the same bolts 152 and nuts 154 that assemble the 90-degree redirector kit. FIG. 12B shows an exploded perspective view of the 90-degree redirector assembly 200 that more clearly displays the components and assembly of a 90-degree redirector for redirecting L-shaped cable tray 90-degrees in either direction.

Figure 13:
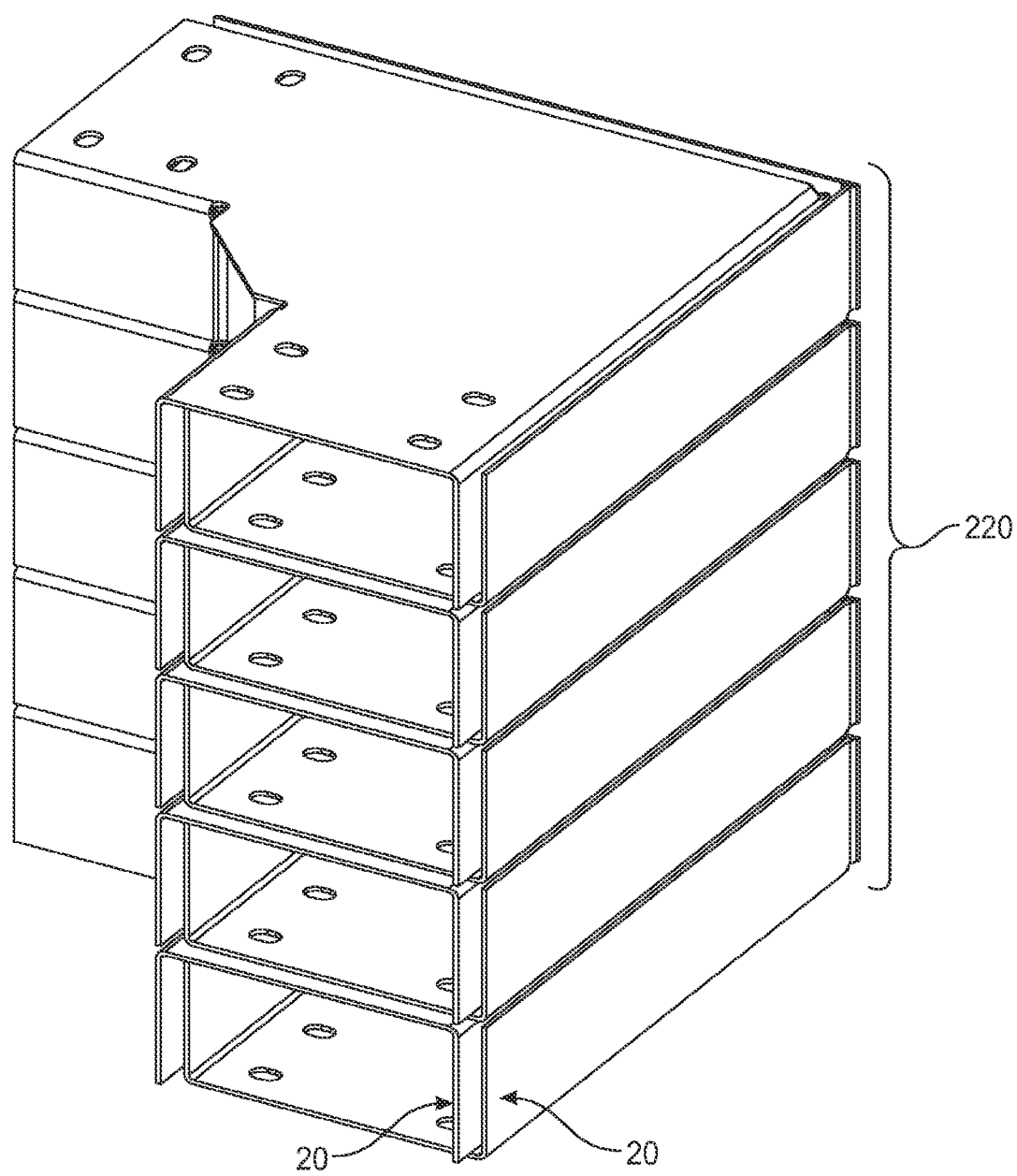
FIG. 13 shows a perspective view of a stack of ten horizontal 90-degree connectors FIG. 1, made according to the prior art.

FIG. 13 shows a stack 220 of ten, prior art (welded) 90-degree horizontal redirectors 20 of FIG. 1, arranged in pairs, one upside down with respect to the next, to stack them as efficiently as possible, and yet they do not compactly nest one-within-the-other. While some space savings can be gained from the stack presented in FIG. 13, much of the volume of stack 220 is empty.

Figure 14:
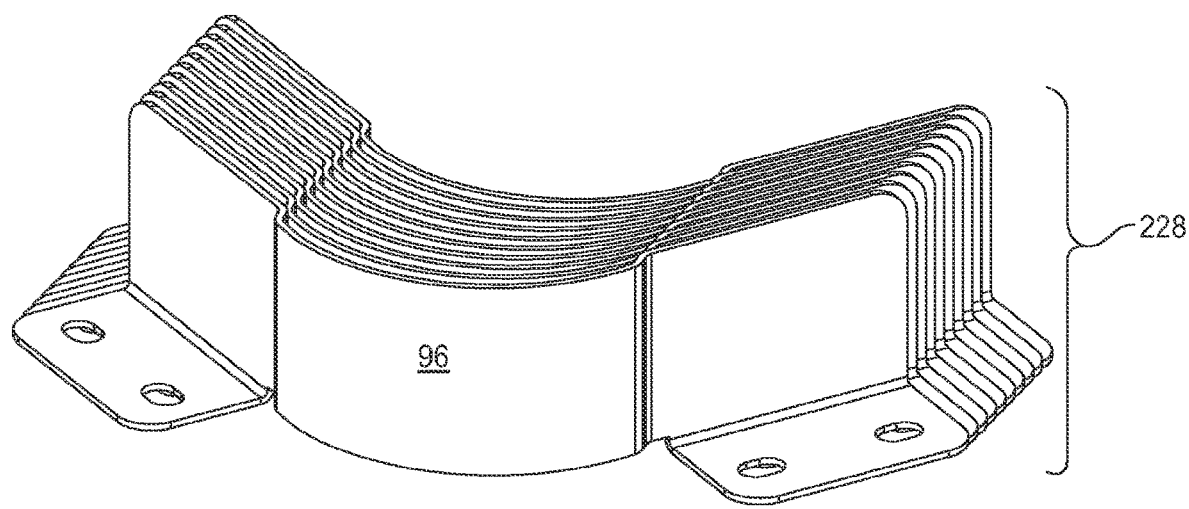
FIG. 14 is a perspective view of a nested stack of ten 90-degree curved flange fittings, according to an aspect of the disclosure.

FIG. 14 shows a nested stack 228 of curved flange fittings 96 of FIG. 5A, of the present disclosure for space-saving shipping or storage. Nested stack 228 uses packing space efficiently by nesting curved flange fittings 96. Nesting enables the number of units stored per unit of storage volume to increase as the number of units being stored increases: 10 parts can be stored more efficiently than one part. Nesting of items means that when two parts are put in adjacent relationship, at least part of the unused storage volume required to store the first part is used by the next part, so that the percent of unused volume in a stack of parts declines as the nesting efficiency increases.

Figure 15:
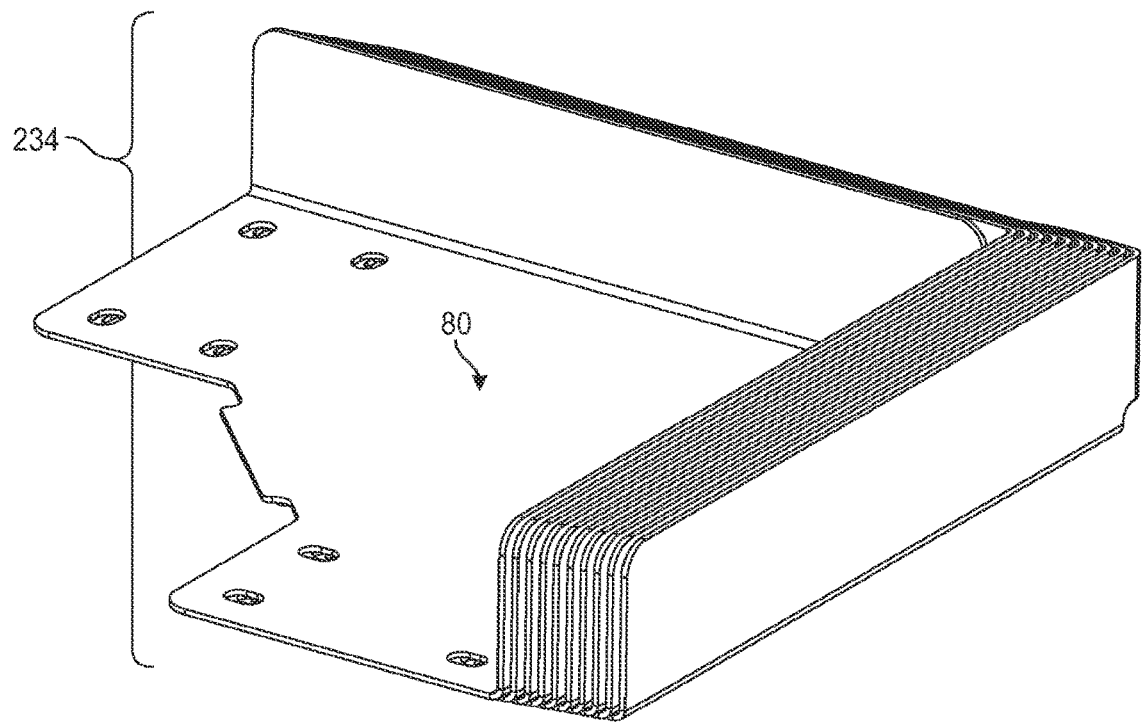
FIG. 15 is a perspective view of a nested stack of ten 90-degree redirector bases, according to an aspect of the disclosure.

FIG. 15 shows a nested stack 234 of horizontal 90-degree redirector bases 80 of FIG. 4 for space-saving shipping and storage. Horizontal 90-degree redirector bases 80 can accept 90-degree flange fittings 96 or 98 and two cable trays. Together horizontal redirector bases 80 and 90-degree flange fittings of the present disclosure in quantity require considerably less volume for storage and shipping.

Figure 16:
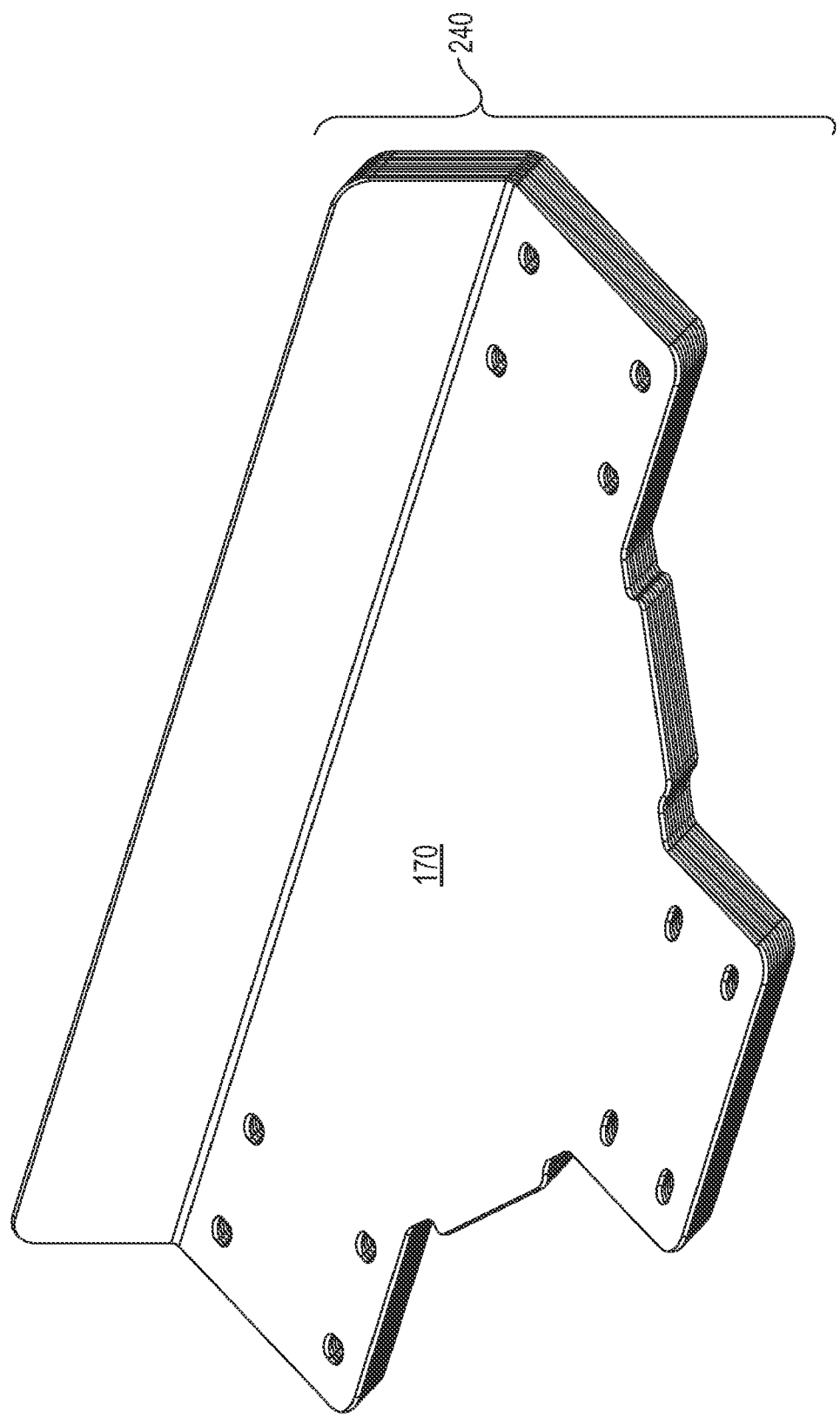
FIG. 16 is a perspective view of a nested stack of ten T-redirector bases, according to an aspect of the disclosure.

FIG. 16 shows a nested stack 240 of horizontal T-redirector bases 170 for space-saving shipping and storage. T-redirector bases 170 can accept two 90-degree flange fittings 96 or 98 and three cable trays.

The present, non-welded, cable tray redirectors may be provided as "kits" that include all the components specifically designed and selected to work together and assemble into a complete cable tray redirector assembly. Each kit may include: one redirector base; one or more curved and/or straight diagonal flange fitting; two or more tightenable fasteners for each matching cable tray redirector; and optionally, auxiliary fasteners to secure additional features of or to the redirector. The main fasteners serve to secure both the assembly of the redirector and connect cable tray sections to the redirector.

Connecting fasteners may be provided together with cable tray redirectors or in certain situations may be provided by others according to customer's requirements. Connecting fasteners with low profile heads provide greater capacity inside the tray system. Additional fasteners may be provided for tray runs for mounting or installing the cable tray run or to connect other components to the cable tray run.

Connecting fasteners are preferably bolts and other "tightenable" fasteners, because they are generally better able to maintain the electrical continuity needed to meet industrial electrical codes and regulations.

If bolts are used for assembling tray redirectors and the tray system, nuts, locking nuts, or flanged locking nuts may be used with or without washers, to create contact pressure and contact surface area, between the reconnector and the tray surfaces for electrical continuity, which may be useful to meet industrial electrical codes and regulations.

The fasteners that are used to assemble a cable tray redirector, according to the present disclosure, may be the same fasteners that connect cable tray ends to the cable tray redirector.

Fasteners connecting the outside wall corner of an elbow-type redirector base (as in corner 84 of redirector base 80) are in addition to those required to connect the cable tray sections to the cable tray redirector.

Where redirecting connectors have larger bend radii or longer wall lengths the curved or straight diagonal flange fittings may be reinforced with ribs, fasteners, brackets or the like for rigidity of the curved or diagonal flange within the overall assembly.

The elimination of welding, heating or stressing metal in cable tray components reduces cost and increases product desirability for use in safety-related products or products used by the nuclear industry or facilities where there are seismic restrictions.

Since many cable trays have multiple rows of parallel holes and most cable redirectors connect two tray sections, the quantities of horizontal 90° curved flange fittings that require offset or staggered flanges is normally relatively small. Therefore, curved flange or diagonal straight flange fittings are generally identical throughout the redirectors of a cable tray run where the cable tray is of the same size and configuration and the degree and radius of redirections does not vary. Where more than two intersecting, narrow cable tray sections intersect, a combination of higher and lower flanges can be used to construct a "T" or cross redirector.

What is claimed is:

1. A cable tray redirector for use with at least two cable trays, consisting essentially of:
    a base with a tab and at least one hole formed in the base adjacent to the tab; and
    a flange fitting having two, spaced-apart flanges and at least one hole formed in each flange of the two spaced-apart flanges, the at least one hole formed in each flange being registrable with at least one hole formed in the base adjacent to the tab, the tab of the base being below the flange fitting and between the two spaced-apart flanges.

2. The cable tray redirector of claim 1, further comprising at least one fastener securing each flange of the two spaced-apart flanges of the flange fitting to the base beside the tab.

3. The cable tray redirector of claim 1, wherein the flange fitting includes a curved section between the two spaced-apart flanges.

4. The cable tray redirector of claim 1, wherein the flange fitting includes a flat section between the two spaced-apart flanges.

5. The cable tray redirector of claim 1, wherein the two spaced-apart flanges are joined to the base at an angle with respect to each other.

6. The cable tray redirector of claim 1, wherein the two spaced apart flanges are joined to the base at a 90-degree angle with respect to each other.

7. The cable tray redirector of claim 1, wherein the base is configured to nest with a second base.

8. The cable tray redirector of claim 1, wherein the flange fitting is configured to nest with another flange fitting.

9. A cable tray redirector for use with at least two cable trays, comprising:
    a base with a tab extending outwardly from the base and at least two holes formed in the base adjacent to the tab, the base includes a first exterior side in a first plane and a second exterior side in a second plane, wherein the first plane is perpendicular to the second plane, a first interior side, a second interior side, a first end that extends between the first exterior side and the first interior side, and a second end that extends between the second exterior side and the second interior side; and
    a flange fitting having two, spaced-apart flanges and at least one hole formed in each flange of the two space-apart flanges, the at least one hole formed in the each flange being registrable with at least one hole of the at least two holes formed in the base adjacent to the tab, the tab of the base being below the flange fitting and between the two spaced-apart flanges.

10. The cable tray redirector of claim 9, further comprising at least one fastener securing each flange of the two spaced-apart flanges of the flange fitting to the base beside the tab.

11. The cable tray redirector of claim 9, wherein the flange fitting includes a curved section between the two spaced-apart flanges.

12. The cable tray redirector of claim 9, wherein the flange fitting includes a flat section between the two spaced-apart flanges.

13. The cable tray redirector of claim 9, wherein the two spaced-apart flanges are joined to the base at an angle with respect to each other.

14. The cable tray redirector of claim 9, wherein the two spaced apart flanges are joined to the base at a 90-degree angle with respect to each other.

15. A horizontal cable tray redirector assembly for use with at least three cable trays, comprising:
- a deck with a first tab and a second tab, wherein the first tab and the second tab are spaced-apart, and at least two holes are formed in the deck adjacent to the first tab and the second tab;
- a first flange fitting having two, spaced-apart flanges and at least one hole formed in each flange of the two spaced-apart flanges, the at least one hole formed in each flange being registrable with at least one hole of the at least two holes formed in the deck adjacent to the first tab, the first tab of the deck being below the first flange fitting and between the two spaced-apart flanges; and
- a second flange fitting having two, spaced-apart flanges and at least one hole formed in each flange of the two spaced-apart flanges, the at least one hole formed in each flange being registrable with at least one hole of the at least two holes formed in the deck adjacent to the second tab, the second tab of the deck being below the first flange fitting and between the two spaced-apart flanges.

16. The horizontal cable tray redirector assembly of claim 15, further comprising a wall perpendicular to the deck having a top end, a front side, a back side, a first end, and a second end opposed to the first end.

17. The horizontal cable tray redirector assembly of claim 15, further comprising at least one fastener securing each flange of the two spaced-apart flanges of the first flange fitting to the deck beside the first tab, and at least one fastener securing each flange of the two spaced-apart flanges of the second flange fitting to the deck beside the second tab.

18. The horizontal cable tray redirector assembly of claim 15, wherein the first flange fitting and the second flange fitting includes a curved section between the two spaced-apart flanges.

19. The horizontal cable tray redirector assembly of claim 15, wherein the first flange fitting and the second flange fitting includes a flat section between the two spaced-apart flanges.

20. The horizontal cable tray redirector assembly of claim 15, wherein the deck is configured to nest with a second deck, the first flange fitting is configured to nest with the second flange fitting.

* * * * *